US010068120B2

(12) United States Patent
Lyon et al.

(10) Patent No.: US 10,068,120 B2
(45) Date of Patent: Sep. 4, 2018

(54) HIGH DYNAMIC RANGE FINGERPRINT SENSING

(71) Applicant: Apple Inc., Cupertino, CA (US)

(72) Inventors: Benjamin B. Lyon, San Jose, CA (US); Giovanni Gozzini, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 13/843,119

(22) Filed: Mar. 15, 2013

(65) Prior Publication Data
US 2014/0267659 A1    Sep. 18, 2014

(51) Int. Cl.
*G06K 9/00*    (2006.01)
*G06K 9/03*    (2006.01)
*G06K 9/40*    (2006.01)

(52) U.S. Cl.
CPC ....... *G06K 9/0002* (2013.01); *G06K 9/00067* (2013.01); *G06K 9/03* (2013.01); *G06K 9/40* (2013.01)

(58) Field of Classification Search
CPC .... G06K 9/0002; G06K 9/00067; G06K 9/03; G06K 9/40; G06K 9/00013; G06K 9/00
USPC .............................................. 328/124; 348/77
See application file for complete search history.

(56) References Cited

U.S. PATENT DOCUMENTS

| | | | |
|---|---|---|---|
| 3,863,219 A | * | 1/1975 | Rohrer ..................... G06K 9/00 330/103 |
| 5,828,773 A | * | 10/1998 | Setlak ................... G06K 9/0002 382/126 |
| 6,049,620 A | * | 4/2000 | Dickinson .............. G01B 7/004 382/108 |
| 6,125,192 A | * | 9/2000 | Bjorn ...................... G06F 21/32 340/5.83 |
| 6,323,846 B1 | | 11/2001 | Westerman et al. |
| 6,546,152 B1 | | 4/2003 | Hou |

(Continued)

FOREIGN PATENT DOCUMENTS

| | | |
|---|---|---|
| CN | 1818927 | 8/2006 |
| CN | 1882952 | 12/2006 |

(Continued)

OTHER PUBLICATIONS

Author Unknown, "Fingerprint Recognition," National Science and Technology Council (NSTC), Committee on Technology, Committee on Homeland and National Security, Subcommittee on Biometrics, Aug. 7, 2006, 13 pages.

(Continued)

*Primary Examiner* — Jay Au Patel
*Assistant Examiner* — Marnie Matt
(74) *Attorney, Agent, or Firm* — Brownstein Hyatt Farber Schreck, LLP

(57) ABSTRACT

Improving fingerprint image measurement despite damage to the stratum corneum. Determining whether a fingerprint image is adequate for matching with a database. If not, re-measure those image portions that are inadequate (overexposed or underexposed), such re-measuring a minimal selection of image portions. An amount of time or power to re-measure is minimized. Improving fingerprint image data collection despite fixed pattern noise like saturated bars in blocks of picture elements. Determining a histogram of grayscale values, removing fixed pattern noise, and expanding real histogram values to obtain more bits of precision.

21 Claims, 7 Drawing Sheets

(56) References Cited

U.S. PATENT DOCUMENTS

| | | |
|---|---|---|
| 6,570,557 B1 | 5/2003 | Westerman et al. |
| 6,668,072 B1 | 12/2003 | Hribernig |
| 6,677,932 B1 | 1/2004 | Westerman |
| 6,757,410 B1 | 6/2004 | Nakashima |
| 6,788,340 B1 | 9/2004 | Chen et al. |
| 6,795,569 B1 | 9/2004 | Setlak et al. |
| 6,888,536 B2 | 5/2005 | Westerman et al. |
| 6,987,520 B2 | 1/2006 | Criminisi et al. |
| 7,110,581 B2 | 9/2006 | Xia et al. |
| 7,194,115 B2 | 3/2007 | Uchida |
| 7,194,116 B2 | 3/2007 | Du et al. |
| 7,274,807 B2 | 9/2007 | Hillhouse et al. |
| 7,333,637 B2 | 2/2008 | Walfridsson |
| 7,401,056 B2 | 7/2008 | Kam |
| 7,424,218 B2 | 9/2008 | Abiko |
| 7,492,391 B1* | 2/2009 | Kaplinsky ............... G06T 5/50 348/211.3 |
| 7,492,925 B2 | 2/2009 | Silvester |
| 7,574,022 B2 | 8/2009 | Russo |
| 7,616,787 B2 | 11/2009 | Boshra |
| 7,634,117 B2 | 12/2009 | Cho |
| 7,746,375 B2 | 6/2010 | Ketelaars et al. |
| 7,804,984 B2 | 9/2010 | Sidlauskas et al. |
| 7,853,053 B2 | 12/2010 | Liu et al. |
| 7,874,485 B2 | 1/2011 | Meier et al. |
| 7,876,310 B2 | 1/2011 | Westerman et al. |
| 7,903,847 B2 | 3/2011 | Higuchi |
| 7,974,475 B1 | 7/2011 | Minter |
| 8,032,758 B2 | 10/2011 | Tian |
| 8,077,935 B2 | 12/2011 | Geoffroy et al. |
| 8,090,163 B2 | 1/2012 | Schuckers et al. |
| 8,125,543 B2 | 2/2012 | Cho |
| 8,131,026 B2 | 3/2012 | Benkley et al. |
| 8,145,656 B2 | 3/2012 | Shatz et al. |
| 8,151,334 B2 | 4/2012 | Lauper |
| 8,154,628 B2 | 4/2012 | Ishida et al. |
| 8,170,346 B2 | 5/2012 | Ludwig |
| 8,180,118 B2 | 5/2012 | Neil et al. |
| 8,295,560 B2 | 10/2012 | Abiko |
| 8,300,904 B2 | 10/2012 | Chen et al. |
| 8,306,288 B2 | 11/2012 | Rahmes et al. |
| 8,358,815 B2 | 1/2013 | Benkley et al. |
| 8,515,139 B1 | 8/2013 | Nechyba et al. |
| 8,605,960 B2 | 12/2013 | Orsley |
| 8,631,243 B2 | 1/2014 | Baldan et al. |
| 8,705,813 B2 | 4/2014 | Matsuyama et al. |
| 8,787,631 B2 | 7/2014 | Abiko |
| 8,837,786 B2 | 9/2014 | Hwang et al. |
| 8,897,568 B2 | 11/2014 | Miyano |
| 9,134,902 B2 | 9/2015 | Kang et al. |
| 9,846,799 B2 | 12/2017 | Westerman et al. |
| 2002/0012455 A1 | 1/2002 | Benckert |
| 2002/0154829 A1* | 10/2002 | Tsukioka ............... G06T 5/009 382/254 |
| 2004/0034597 A1 | 2/2004 | Durand |
| 2004/0215615 A1 | 10/2004 | Larsson et al. |
| 2005/0105785 A1* | 5/2005 | Shigeta ............... G06K 9/0004 382/124 |
| 2005/0270140 A1* | 12/2005 | Oh ..................... G06K 9/00006 340/5.83 |
| 2006/0098112 A1* | 5/2006 | Kelly ................. H04N 5/23222 348/333.12 |
| 2006/0110015 A1* | 5/2006 | Rowe ................. G06K 9/00013 382/124 |
| 2006/0170802 A1* | 8/2006 | Misawa ................ H04N 3/155 348/297 |
| 2008/0113685 A1* | 5/2008 | Ishida ................. G06K 9/00013 455/556.1 |
| 2008/0128495 A1* | 6/2008 | Weintraub ............ G06F 3/044 235/382 |
| 2008/0187189 A1* | 8/2008 | Shin .................... G06K 9/0002 382/124 |
| 2008/0247615 A1* | 10/2008 | Mainguet ........... G06K 9/00026 382/125 |
| 2009/0074263 A1* | 3/2009 | Higuchi ............... A61B 5/1172 382/126 |
| 2009/0226052 A1* | 9/2009 | Fedele ............... G06K 9/00046 382/125 |
| 2009/0232362 A1 | 9/2009 | Otsubo et al. |
| 2009/0279745 A1 | 11/2009 | Liautaud |
| 2010/0080425 A1 | 4/2010 | Bebis et al. |
| 2010/0232654 A1 | 9/2010 | Rahmes et al. |
| 2010/0232659 A1 | 9/2010 | Rahmes et al. |
| 2010/0309332 A1* | 12/2010 | Ueda .................. H04N 5/23293 348/229.1 |
| 2010/0329561 A1* | 12/2010 | Sakai ................. G06K 9/00664 382/173 |
| 2011/0176024 A1* | 7/2011 | Kwon ................ H04N 5/23232 348/222.1 |
| 2011/0274356 A1 | 11/2011 | Tasdizen et al. |
| 2011/0279664 A1 | 11/2011 | Schneider et al. |
| 2012/0002846 A1* | 1/2012 | Yokoi .................. G06K 9/6265 382/115 |
| 2012/0045138 A1 | 2/2012 | Cote |
| 2013/0004096 A1 | 1/2013 | Goh et al. |
| 2013/0016919 A1* | 1/2013 | Watanabe ............ H04N 5/2624 382/284 |
| 2013/0053107 A1 | 2/2013 | Kang et al. |
| 2013/0083074 A1 | 4/2013 | Nurmi et al. |
| 2013/0108125 A1 | 5/2013 | Storm et al. |
| 2013/0128121 A1 | 5/2013 | Agarwala et al. |
| 2013/0272586 A1 | 10/2013 | Russo |
| 2013/0294660 A1 | 11/2013 | Heilpern et al. |
| 2013/0308838 A1 | 11/2013 | Westerman et al. |
| 2014/0003677 A1* | 1/2014 | Han .................... G06K 9/00006 382/124 |
| 2014/0056493 A1 | 2/2014 | Gozzini |
| 2014/0212010 A1 | 7/2014 | Han et al. |
| 2014/0226879 A1 | 8/2014 | Westerman et al. |
| 2014/0241595 A1* | 8/2014 | Bernstein ............. G06K 9/0002 382/124 |
| 2014/0286545 A1* | 9/2014 | Yi ...................... G06K 9/00046 382/124 |
| 2015/0036878 A1* | 2/2015 | Nashizawa ............... G06T 5/50 382/103 |
| 2016/0012273 A1 | 1/2016 | Westerman et al. |
| 2016/0180184 A1 | 6/2016 | Vieta et al. |
| 2017/0039409 A1 | 9/2017 | Han et al. |

FOREIGN PATENT DOCUMENTS

| | | |
|---|---|---|
| CN | 101609499 | 12/2009 |
| WO | WO 12/008168 | 1/2012 |
| WO | WO 12/009791 | 1/2012 |

OTHER PUBLICATIONS

Rajanna et al., "A comparative study on feature extraction for fingerprint classification and performance improvements using rank-level fusion," *Pattern Anal. Applic.*, published online Apr. 28, 2009, DOI 10.1007/s10044-009-0160-3, 10 pages.

U.S. Appl. No. 15/669,789, filed Aug. 4, 2017, Westerman et al.

* cited by examiner

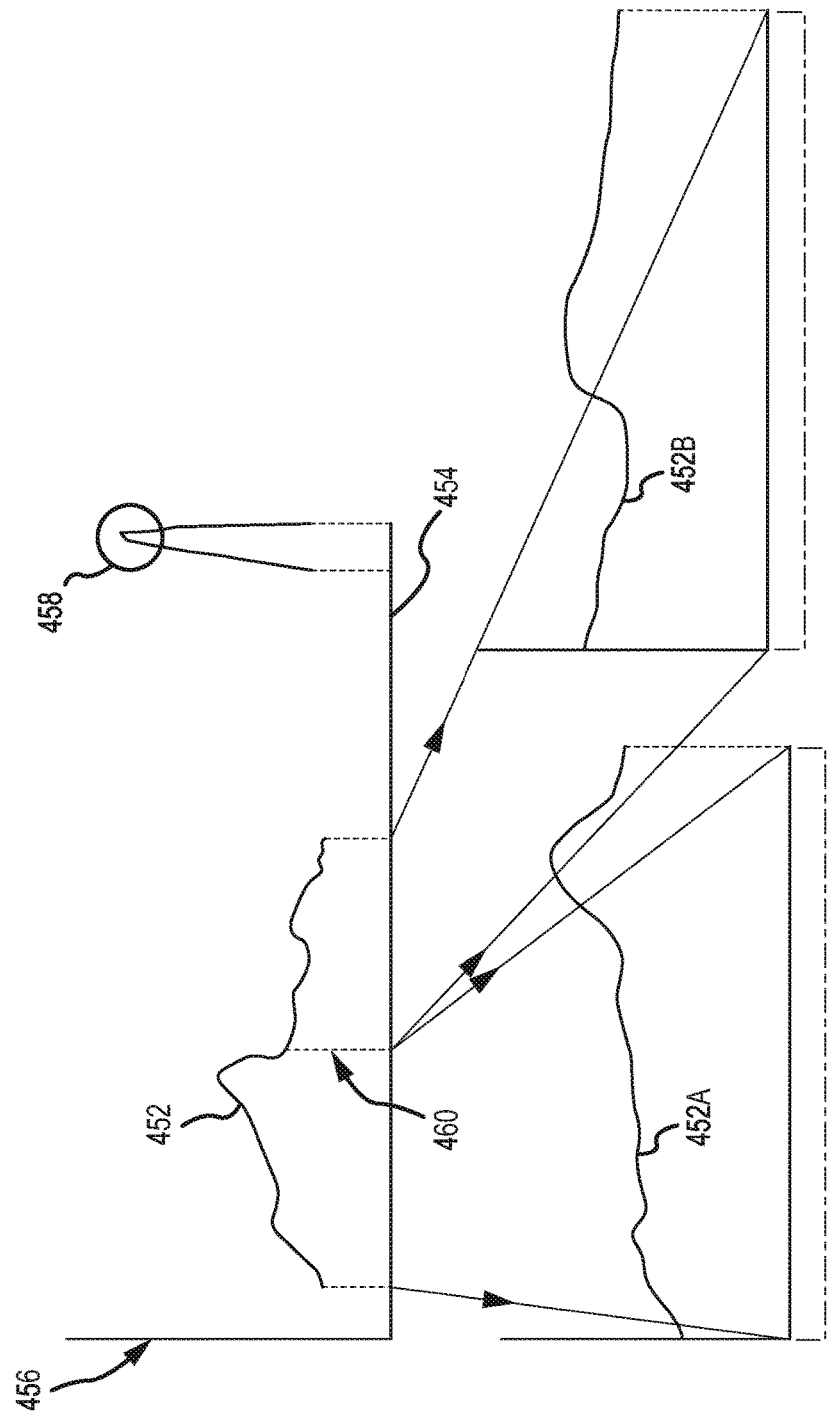

HIGH DYNAMIC RANGE FINGERPRINT SENSING

TECHNICAL FIELD

This application generally relates to high dynamic range sensing, and more particularly to dynamically adjusting a sensing range of a biometric sensor.

BACKGROUND

It sometimes occurs that, in devices that attempt to match fingerprints or similar data structures, collecting fingerprint or similar information can be subject to errors or noise. One form of errors can occur when the user's finger has abrasions, gaps, pits, scratches, or other damage to its outer layer. These artifacts can affect a fingerprint sensor negatively, particularly in that they can cause the capacitance measured by the sensor to be measured abnormally. For example, the in the region of such artifacts, the fingerprint sensor might measure an abnormally high capacitance or an abnormally low capacitance, either way causing a fingerprint image derived from the sensor to be difficult to match against a database of known fingerprints.

One possible response to measurement, by the sensor, of an abnormally high capacitance or an abnormally low capacitance, is to re-measure the capacitance of the user's finger, such as with other parameters for measuring capacitance. While this technique might generally have the benefit of obtaining a fingerprint image that is less subject to problems due to these artifacts, it is subject to the drawback of taking substantial time to re-measure the capacitance of the user's finger. During this substantial time the user might grow impatient, move his finger, or otherwise degrade the operation of the fingerprint sensor.

It also sometimes occurs that, in devices that attempt to sense image data, such as fingerprints and similar image data, collecting image data can be subject to a substantial level of fixed pattern noise. Collected image data can include artifacts, whether of the nature of the image or of the nature of the method of collection of image data. For example, fingerprint image data can include vertical bars in the image. In such cases, it might occur that blocks or tiles of multiple elements of image data can include one (or more) lines that have a maximum grayscale level, as if a black line had been drawn on the image data. Blocks may be 8×8, 10×10, or any other suitable size, and need not be square.

In such cases, it might also occur that adjacent elements of image data can include one (or more) lines that have a maximum greyscale level, as though a black shape of arbitrary area had been drawn on the image data. In other cases, it might also occur that one (or more) lines can be present in a block of image data, but not so many lines that the block of image data cannot be used. In such cases, it might also occur that the fixed pattern noise is more significant than the raw data, such as wherein the image data might be read by a sensor at values near 200 microvolts, while the fixed pattern noise might be read by the same sensor at values near 10 millivolts. This fixed pattern noise can pose a particular problem in that large noise values can reduce the device's sensitivity to midrange grayscale levels, in an effort to distinguish differing noise levels.

Each of these examples, as well as other possible considerations, can cause one or more difficulties as a result of excessive cost (such as time or processing power required) to image or match fingerprints.

SUMMARY OF THE DISCLOSURE

This application provides techniques, including devices and structures, and including method steps, that can improve fingerprint image measurement, with respect to time and power requirements, notwithstanding the presence of artifacts as described above.

In one embodiment, a processing unit can determine a fingerprint image in response to a measurement of the user's finger and resulting imaging of a user's fingerprint, and can determine whether that fingerprint image is adequate for matching with a fingerprint image database (such as a database of known fingerprints of known users). If the processing unit determines that the fingerprint image will not be adequate for matching, the processing unit can re-measure those portions of the image that the processing unit determines are inadequate.

For example, if the user's finger is subject to artifacts as described above, the processing unit can determine that some portions of the fingerprint image are overexposed or underexposed. This can have the effect that those portions of the fingerprint image might not show adequate detail with respect to fingerprint ridges, ridgelines, pores, or other indicia that could be used for matching with a fingerprint image database.

In one embodiment, the processing unit can identify those portions of the fingerprint image that are overexposed or underexposed, and re-measure a minimal selection of portions of the fingerprint image. This can have the effect that the amount of effort (such as time required to re-measure, or power required to re-process) to re-measure those portions of the fingerprint image can be minimized. This can have the effect of reducing the wait time involved for the user to have their fingerprint measured and matched.

Although this application describes exemplary embodiments and variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. The drawings and detailed description are intended to be illustrative in nature and not restrictive.

BRIEF DESCRIPTION OF THE DRAWINGS

FIG. 4A generally shows a histogram for a fingerprint image.

DETAILED DESCRIPTION

Overview

Generally, embodiments disclosed herein may take the form of an apparatus or method for amplifying a dynamic range of a sensor, such as a fingerprint sensor. Other embodiments may amplify the sensing range of any fingerprint sensor. In certain embodiments, the effective resolution of the sensor may be expanded. Likewise, false data due to scratches, cuts, surface imperfections and the like on a finger may be accounted for by dynamically adjusting the gain and/or range of sensitivity of the sensor.

It should also be appreciated that certain portions of fingerprint data may be amplified and expanded to provide additional effective resolution to the values (whether capacitive or otherwise) captured by the fingerprint sensor. Embodiments described herein may provide techniques and systems for amplifying a signal, corresponding to one or more features of a fingerprint, in comparison to a carrier wave for that signal and/or resulting fixed pattern noise. With respect to fingerprint sensors, fixed pattern noise may result from certain hardware limitations and/or characteristics of a finger being imaged. Fixed pattern noise often causes one or more portions of an imaged fingerprint (or portion of a fingerprint) to appear solid black or solid white. This may occur due to differences in the responsivity of certain portions of a sensor array. For example, one channel or imaging element may experience a higher gain than others, due to a variety of factors that may include variations in signal amplification, variations in imaging element size, differences in imaging sensor material between imaging elements, electrical interference from other circuitry, and the like. The exact cause of fixed pattern noise may be indeterminate or even relatively irrelevant; the effect on the captured image may nonetheless be real. By dynamically adjusting the range of operation of the sensor, defects due to fixed pattern noise may be overcome.

Accordingly, embodiments described herein may compensate for, ignore, or otherwise discard fingerprint imaging errors due to fixed pattern noise.

Fingerprint Capture

Figure 1:
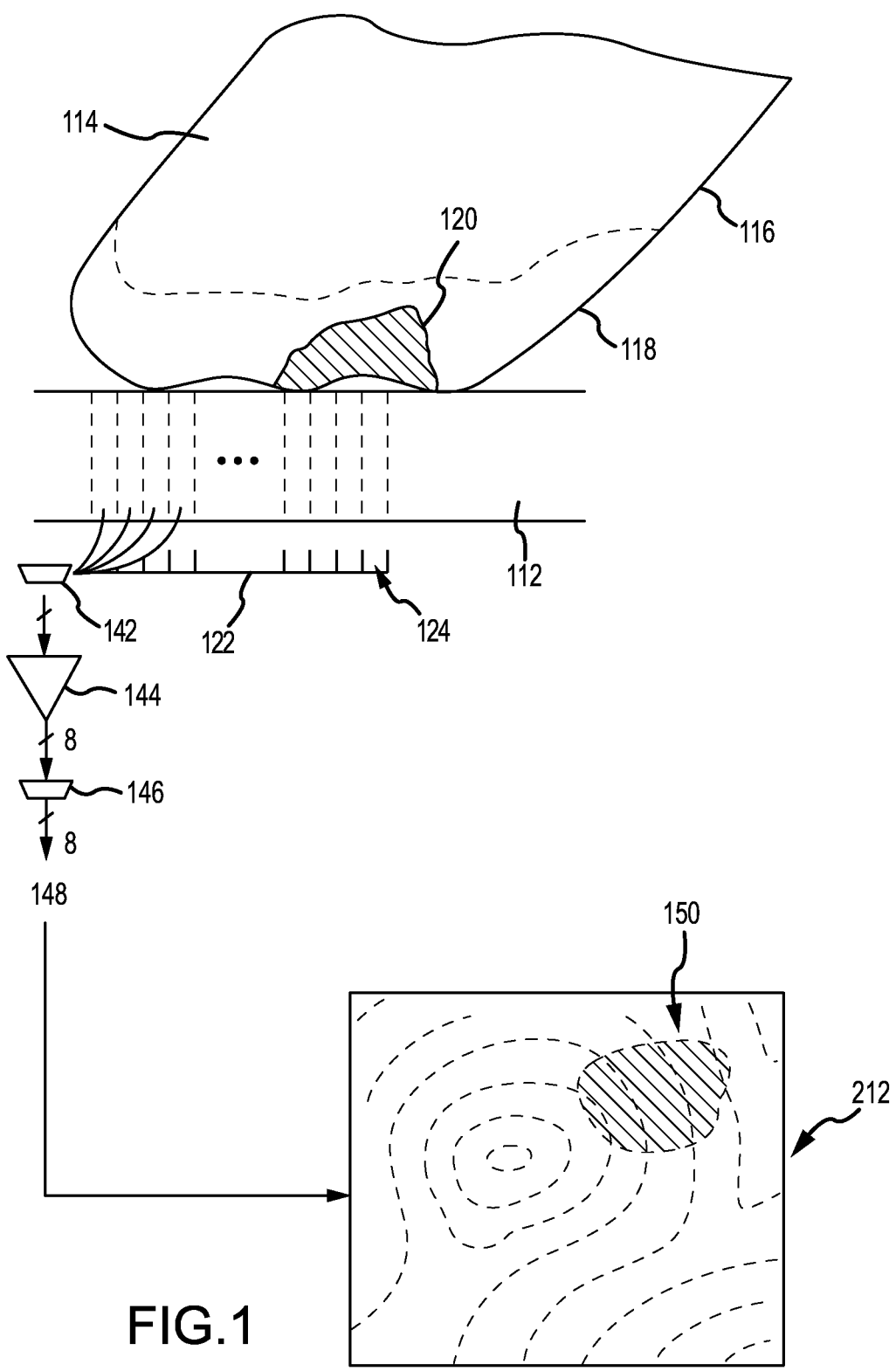
FIG. 1 shows a schematic drawing of application of a user's finger to a fingerprint sensor.

FIG. 1 shows a conceptual drawing of application of a user's finger to a fingerprint sensor.

A fingerprint sensor system can include a fingerprint sensor, such as a fingerprint sensor, to which the user can apply their finger, or a portion thereof. The fingerprint sensor may image one or more features of the finger, such as ridges and valley of a fingerprint. Generally, such captured fingerprint images may be captured a portion of block at a time. For example, a fingerprint sensor may capture a certain number of blocks, each made up of individual "picture elements," with every scan. In one embodiment an a certain number of picture elements (for example, an 8×8 array) may correspond to, or form, a single block or tile (the terms "block" and "tile" are used interchangeably herein). Each picture element may correspond to the smallest size information element that may be captured by a fingerprint scanner. The picture elements may be assembled into blocks, which in turn may be assembled into a captured fingerprint image. It should be appreciated that a "fingerprint image" need not refer to an image that includes the entirety of a fingerprint. Rather, only a portion of a fingerprint may be present in any given fingerprint image. In some embodiments, a single fingerprint image may be sufficient to match against stored fingerprint data and identify a user, while in other embodiments multiple images or portions of images may be required. Further, it should be appreciated that a "fingerprint image" or "captured fingerprint image" may be represented by, or analogous to, a data set abstracted from such an image, one example of which is a ridgeflow map. Thus, discussions of one are intended to encompass the other.

Any suitable fingerprint sensor may be used with embodiments and techniques disclosed herein. Suitable fingerprint sensors include capacitive sensors, ultrasonic sensor, optical sensors, pyro-electric sensors, and so on.

The fingerprint sensor system can be coupled to a processing unit (as described herein, below), which can maintain a fingerprint information database, and which can attempt to match the captured image against information about known fingerprints from known users.

For example, when the processing unit or other element of the embodiment matches the captured fingerprint image against a known fingerprint from an authorized user, the processing unit can take one or more actions in response thereto. For example, the processing unit can authorize usage of a device for an individual procedure, for a sequence of procedures, for a selected time duration, until a trigger indicating that the user is no longer authorized, or until the user de-authorizes the device. For example, the user can de-authorize the device by turning the device off, or by handing the device to another user.

In one embodiment, the fingerprint sensor system can be coupled to and be used to authorize a device. For example, the device can be a smart phone, tablet computing device, portable computer, touch screen on an appliance or automobile or similar device, or any other device having touch device capability, a function button, or other elements related to the nature of the technology described herein. As discussed in greater detail with respect to FIG. 5, the device can include a processing unit, program and/or data memory, instructions or modules directing the processing unit to perform functions as described herein, and other components. The device can also include data memory storing a fingerprint database that includes images and/or other data relating to fingerprints or other biometric information suitable for identifying and authenticating one or more users of the device. For example, the data memory can include one or more images of fingerprints, one or more transformations of fingerprints, other data sets abstracted from fingerprints, or other information with respect to fingerprints.

In one embodiment, the fingerprint sensor system includes a dielectric element 112, to which the user applies his finger, or a portion thereof, so that an associated sensor may generate a captured fingerprint image. For example, the dielectric element 112 can include or be part of a cover glass element of the device, such as the display image cover of a tablet computing device, a smart phone, or similar device. The cover glass element can include a dielectric such as sapphire, glass, chemically treated glass, plastic, resin, or some other material suited to the purposes or functions described herein.

In one embodiment, the user places his finger 114 in contact (or near-contact) with the dielectric element 112. The user's finger 114 includes at least a layer of live skin 116 and a layer of dead skin 118, the latter sometimes referred to as the "stratum corneum." The layer of dead skin 118 is placed in contact with the dielectric element 112.

It might occur that the stratum corneum, the layer of dead skin 118, includes one or more abrasions, gaps, pits, scratches, or other damage 120 to its outer layer, such as described above. As mentioned, this damage 120 can have an effect on the fingerprint image measured by the fingerprint sensor system. When coupled with fixed pattern noise, for example, the gap between the sensor and the skin caused by the damage 120 may cause that portion of a captured fingerprint image to be either overexposed (e.g., appear black in the corresponding image) or underexposed (e.g., appear white in the corresponding image). Either way, that data is not only inaccurate but may prevent an embodiment from successfully matching a captured fingerprint to a stored fingerprint, and thereby identifying a user.

Figure 2:
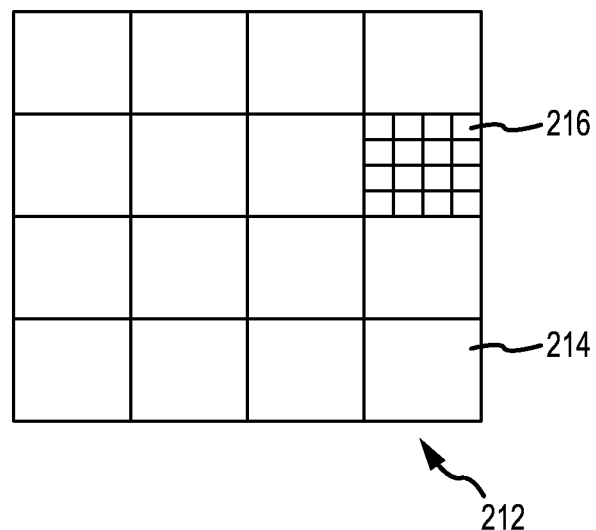
FIG. 2 shows a conceptual drawing of fingerprint image.

In one embodiment, the fingerprint image 212 (shown conceptually in FIG. 2) can include a set of fingerprint image elements 216 (shown with respect to FIG. 2). For example, one or more sensing elements can measure the fingerprint image elements 216. The fingerprint sensor may be formed from or include a number of sensing elements, which may be arranged in a variety of configurations. As one non-limiting example, the sensing elements may be arranged in an array. Each sensing element may capture a fingerprint image element 216 by measuring the capacitance between a portion of the finger overlying the sensing element. If the portion of the finger is farther away, as is the case with a valley of a fingerprint, the measured capacitance is generally lower than if the portion of the finger is closer to the sensing element, as is the case with a fingerprint ridge.

The fingerprint image elements may be combined to form a block 214, and a set of blocks representing adjacent portions of a fingerprint may be combined into an image 212. When combined with fixed pattern noise, damage 120 to a finger or fingerprint may cause one or more image elements 216 to be inaccurate representations of the corresponding portion of a fingerprint. These image elements may be fully black or fully white, for example. In some embodiments, fixed pattern noise alone is sufficient to cause errors in certain image elements 216, regardless of the presence or absence of damage 120 to the stratum corneum 118. Likewise, dryness or other characteristics of a user's finger may combine with fixed pattern noise to generate inaccurate image elements 216.

Returning to FIG. 1, the sensor operation will be discussed in more detail. The sensor 122 may include an array of sensor elements 124, each of which can provide an analog signal describing a relative depth of the layer of live skin 116 above the sensor elements 124. This can have the effect that the sensor provides a set of signals, each of which indicates an individual fingerprint image element 216. Each of the set of signals corresponds to, or is generated by, an individual sensor element 124. It should be appreciated that the sensor elements 124 may be arranged in a grid or array, in a line, or in any other suitable pattern. Accordingly, embodiments discussed herein may be used with swipe sensors, two-dimensional sensors, and the like.

In one embodiment, a multiplexer 142 collects the analog signals from the sensor elements 124 of the sensor 122, and multiplexes them together into sets of eight fingerprint image element signals. For example, each set of eight fingerprint image element signals can be collected into a set of eight channels of fingerprint image element signals.

In one embodiment, the fingerprint image element signals are coupled to one or more amplifiers 144. The amplifiers 144 receive relatively weak signals, and amplify them to become relatively stronger signals. For example, the amplifiers 144 can increase the dynamic range of the fingerprint image element signals so they cover the scope of possible relative strength.

In one embodiment, a set of outputs from the amplifiers 144 are coupled to inputs of a corresponding set of A/D converters 146. The A/D converters 146 receive analog input signals and generate digital output signals representing the same relative strength. This can have the effect of providing a set of digital signals 148. For example, the digital signals 148 can each describe an eight-bit representation of a fingerprint image element. In such examples, that eight-bit representation can describe an unsigned integer grayscale value, such as between 0 and 255.

In one embodiment, the amplifiers 144 and the corresponding A/D converters 146 can have the effect of providing a multi-bit grayscale value describing a degree to which the corresponding fingerprint image element 216 is closer to black or to white. For example, in one encoding schema, an eight-bit grayscale value includes a decimal 0 (hexadecimal "00") value describing a black fingerprint image element 216, a decimal 255 (hexadecimal "FF") value describing a white fingerprint image element 216, and decimal values in between describing fingerprint image element 216 with distinct shades of gray. In further embodiments any suitable encoding schema, such as 10-bit encoding, may be used.

In one embodiment, the digital signals 148 collectively may be processed to provide a fingerprint image 212, which is shown in the figure as having a set of ridges or ridge-lines, and possibly having one or more regions 150 that are either overexposed or underexposed in response to existence of damage 120 to the outer layer of the stratum corneum.

For a first example, it might occur that the fingerprint sensor system can successfully determine whether the fingerprint image 212 definitively matches or definitively does not match any known fingerprint information in the fingerprint information database, despite the presence of the overexposed or underexposed region 150. In such cases, the fingerprint sensor system can inform the processing unit to authorize usage of the device (or refuse to authorize usage of the device) in response thereto, without further manipulation of the fingerprint image 212.

For a second, non-limiting example, it might occur that the fingerprint sensor system cannot determine whether or not the fingerprint image 212 definitively matches or definitively does not match any known fingerprint information in the fingerprint information database, in response to the presence of the overexposed or underexposed region 150. In such cases, the fingerprint sensor system can perform further manipulation of the fingerprint image 212. This can have the effect that the fingerprint sensor system can obtain additional information that would allow it to make a definitive decision with respect to whether the fingerprint image 212 matches or does not match any known fingerprint information in the fingerprint information database. It should be appreciated, however, that imaging techniques disclosed herein may be used under a variety of circumstances and at a variety of times, as discussed later.

Fingerprint Imaging

FIG. 2 shows a conceptual drawing of fingerprint image, which will be discussed in more detail.

A fingerprint image 212 can include a set of image tiles 214, each of which represents a portion of the fingerprint image 212. For example, each image tile 214 can include an eight-bit by eight-bit portion of the fingerprint image 212, and the fingerprint image 212 can include an 88 bit by 88 bit set of fingerprint image elements 216.

As described herein, the fingerprint image 212 can include one or more overexposed or underexposed (e.g., poorly imaged) regions 150, such as might be caused by damage 120 to the outer layer of the stratum corneum, the layer of dead skin 118. As described herein, fingerprint information with respect to the user's finger 114 is affected by a thickness of the layer of dead skin 118, with the consequence that the fingerprint information might be overexposed or underexposed due to the particular choice of amplifier gain and/or fixed pattern noise associated with the sensor. The poorly imaged region 150 may cause errors in identification of a user based on the fingerprint image, such as, but not limited to, false negatives.

In order to overcome poorly imaged regions 150, a variety of techniques may be used. As one example, the fingerprint sensor system can take multiple images of the user's finger 114. These multiple images can be taken in sequence or in parallel. The images may be taken one after another temporally or may be offset from one another along a physical axis and captured simultaneously. As one example, the individual sensor elements 124 making up the fingerprint sensor 122 may be arranged in a pattern defining two sub-sensors. For example, the individual sensor elements 124 may be split into two groups, such that each group belongs to a different sub-sensor. The sub-sensors may be interwoven with one another, like squares on a chessboard—each alternating element may belong to a different sub-sensor. Thus, the sub-sensors may simultaneously image a finger with different gain settings, and the "best" (e.g., non-saturated or least saturated) image may be chosen from those captured by two adjacent sensor elements 124, each of which is associated with a different sub-sensor, and used.

It should be appreciated that the individual sensor elements 124 may be split into multiple groups or sub-sensors and not just two. Likewise, the geometry of each sub-sensor may vary between embodiments and sub-sensors need not have identical geometries. As one non-limiting example, the sensor elements 124 may be split into alternating rows or columns instead of a checkerboard pattern.

As another option, the sub-sensors may each image a finger at a different gain setting. The image elements 216 captured by each sub-sensor may be composited together to form a block 214 or image 212, rather than discarding certain image elements 216. In this fashion, each image element 216 may be formed from a composite of two or more sensor element 124 readings, and thus the saturation and/or effect of fixed pattern noise on any individual image element 216 may be reduced or negated.

In yet another embodiment, there may be no sub-sensors. Rather, all of the sensor elements 124 may be part of a single fingerprint sensor 122. That fingerprint sensor 122 may capture multiple, temporally separated images of a user's fingerprint. Each of the temporally separated images may be captured at a different signal conditioning settings. In other words, conditioning may be applied differently to each temporally separated image so that one image may be the result of gain conditioning, while another image may be the result of offset conditioning. Any appropriate signal adaptation or clarification technique may apply separately or consistently to each temporally separated image; gain adjustment or conditioning is but one example. By way of example, signal conditioning setting #1 may be used to capture image #1, while signal conditioning setting #2 may be used to capture image #2. The gain for each sensor element 124 may be the same in any given signal conditioning setting, or the gains may vary (as is true for all embodiments discussed herein). Regardless, the temporally separated images may be composited to form a single fingerprint image 212, such that no image element 216 is either fully saturated or completely white.

The various fingerprint imaging techniques described herein may be used in a variety of situations. For example, an embodiment may employ one or more of the techniques discussed herein based on a failure to match an imaged fingerprint to an image stored in memory. This may be relatively complex, and thus may require a relatively large processing unit and sizable amount of processing time during imaging and/or matching.

As another option, techniques disclosed herein may be used whenever a captured fingerprint image is of inferior or unacceptable quality. Embodiments may analyze the quality of the fingerprint image upon or after capture, and implement one or more of the techniques herein if the analysis indicates the image quality is unacceptable. It should be appreciated that the "quality" of an image may vary with its intended or actual use, parameters of an imaging and/or matching system, user-defined or programming-defined parameters, and the like.

As a third option, one or more techniques disclosed herein may be implemented constantly, by default, or whenever an image is captured. Such implementation may be performed by the hardware of the fingerprint sensor itself or by the direction of a processing unit.

Expanding on this example, the fingerprint sensor system can select distinct sets of individual fingerprint image elements 216 and combine them into a conflated fingerprint image 212. In a first set of such cases, the fingerprint sensor system can select those tiles 214 that have the "best" (as determined by the fingerprint sensor system) fingerprint image data, and combine those individual tiles into a single fingerprint image 212. In a second set of such cases, the fingerprint sensor system can determine how to match ridges or ridge lines of fingerprint image data at edges of those tiles 214 that have differing amplifier gain, such as attempting to blend fingerprint image elements 216 at the edges of those tiles 214, or such as averaging fingerprint image elements 216 with some small overlap at the edges of those tiles 214.

For a further example, the fingerprint sensor system can select only those portions of the fingerprint image 212 that are overexposed or underexposed, and re-image only those portions of the fingerprint image 212. In a first such case, those portions of the fingerprint image 212 that are overexposed or underexposed can be identified by an excessive amount of low-frequency components, which would indicate that the selected portion is "whited out", that is, overexposed. Alternatively, an excessive amount of high-frequency components in a signal from any single channel may indicate that the corresponding image element 216 is "blacked out", that is, underexposed. Those particular image elements 216 may be selectively resampled at a different gain while the other image elements are not. Thus, only the sensing elements 124 corresponding to the image elements 216 being resampled need be reactivated and re-read. This may save power and time by minimizing the amount of resampling.

Resampling may be further minimized or reduced over the foregoing by certain embodiments. Some embodiments may selectively analyze an image not only to determine if a portion of the image should be resampled, but also may analyze whether or not resampling at a different gain may produce a better image element 216. The embodiment, for example through operation of a processing unit, may analyze localized high frequency content in any given image element 216 and/or in adjacent image elements. This analysis may reveal that a different signal conditioning setting may de-saturate a given image element 216. For example, if adjacent image elements are not fully saturated or near-saturated, changing the gain of a sensor element 124 producing a fully saturated image element 216 may permit the finger portion to be re-imaged and detail captured. A similar analysis may also be performed for any image element 216 that is pure white (e.g., fully desaturated).

For yet another example, the fingerprint sensor system can perform re-imaging in parallel, such as attempting to make multiple images concurrently or simultaneously, or in some other manner. In a first set of such cases, the fingerprint sensor system can include multiple copies of hardware used for making fingerprint images 212, such as coupling the multiplexer 142 to more than one amplifier 144, with the effect of providing more than one amplified copy of the fingerprint image data (each using distinct amplification gain). In a second set of such cases, the fingerprint sensor system can include one or more amplifiers 144, at least one of which includes multiple stages, with outputs provided at more than one of the stages, with the effect of providing more than one signal, each with distinct amplifier gain.

Gain Control

Figure 3:
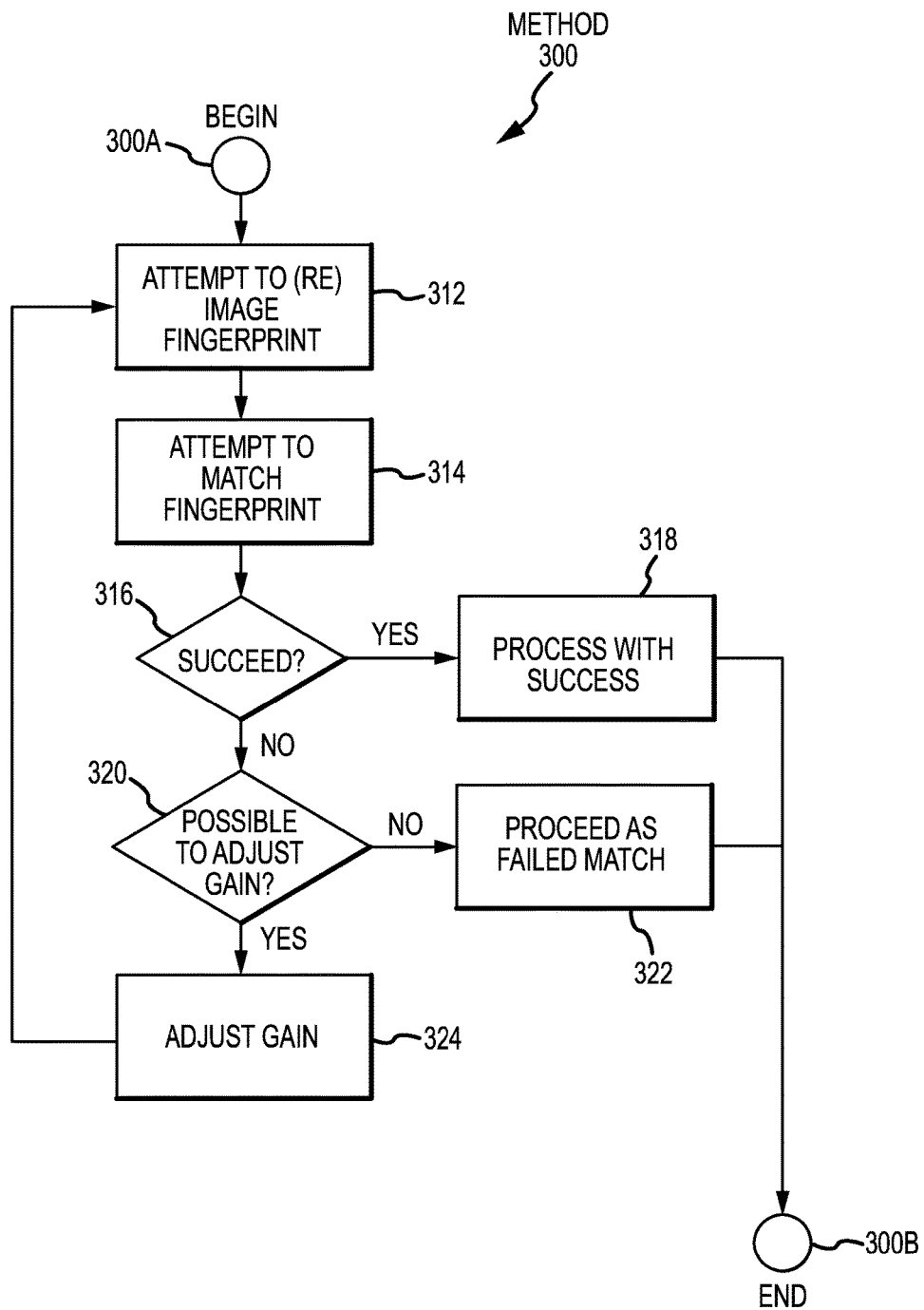
FIG. 3 shows a conceptual drawing of a first method of operation.

FIG. 3 shows a conceptual drawing of a method of operation providing gain control for each of the signals corresponding to one of the sensor elements 124 of the fingerprint sensor 122. Such gain control may be used with any of the embodiments described herein, and particularly with method and structures described above in the section titled "Fingerprint Imaging."

A method 300 includes a set of flow points and method steps. Although these flow points and method steps are shown performed in a particular order, in the context of the invention, there is no particular requirement for any such limitation. For example, the flow points and method steps could be performed in a different order, concurrently, in parallel, or otherwise.

Although these flow points and method steps are sometimes described as being performed by the method 300, in one embodiment, they can be performed by a processing unit in the device, or by hardware provided for the fingerprint sensor system. Although these flow points and method steps are described as performed by a general-purpose processing unit, in the context of the invention, there is no particular requirement for any such limitation. For example, one or more such method steps could be performed by special purpose processing unit, by another circuit, or be offloaded to other processing units or other circuits in other devices, such as by offloading those functions to nearby devices using wireless technology or by offloading those functions to cloud computing functions. Likewise, a "processing unit," as used herein, may be a state machine, micro-controller, processor, logical element or set of elements, and the like. Any processing unit mentioned herein may be embedded in or with an associated fingerprint sensor (for example, implemented as part of the same silicon), embedded or associated with another electronics package or element, such as a system on a chip or the like, or may be discrete and/or dedicated to operations regarding fingerprint sensing.

At a flow point 300A, the method 300 is ready to begin. At a step 312, the method 300 attempts to image (or re-image) the information associated with the fingerprint image 212. As described herein, when the method 300 attempts to image the information associated with the fingerprint image 212, it attempts to collect sensor information with respect to the user's finger 114.

For example, as described above, this step can be performed by hardware provided for the fingerprint sensor system, or by a processing unit provided in the device associated with the fingerprint sensor system (whether a general-purpose processing unit, a special-purpose processing unit, or a processing unit in association with other hardware elements).

In one embodiment, when the method 300 attempts to initially image the information associated with the fingerprint image 212, it associates an amplification gain with the amplifier 144. For example, when the method 300 attempts to initially image the information, it can start with an initial amplification gain, such as an amplification gain likely to work with most users' fingers, or an amplification gain that most recently worked.

In one embodiment, when the method 300 attempts to re-image the information associated with the fingerprint image 212, that is, to image that information a second or later time, it uses a new amplification gain with the amplifier 144. For example, as described below, when the method 300 adjusts the amplification gain for the amplifier 144. the method 300 uses that new amplification gain.

At a step 314, the method 300 attempts to match information in the fingerprint information database with the fingerprint image from the captured fingerprint image. As described herein, if the method 300 is able to make a definitive decision that there is a match, or that there is not a match, between the captured fingerprint image and one or more known user fingerprints, At a step 316, the method 300 determines whether it was successful in making a definitive match-or-no-match decision. If there was a definitive match-or-no-match decision, the method 300 proceeds with the step 318. At the step 318, the method 300 proceeds without any requirement to gather further information. After the step 318, the method 300 proceeds with the flow point 300B, where the method 300 ends. In an alternative embodiment, if it is determined that a match cannot be made, operation 320 may be executed in order to re-image the finger and recapture a fingerprint with different operating parameters for the fingerprint sensor.

At a step 320, the method 300 determines whether it is possible to further adjust the amplification gain for the amplifier 144. For example, it might occur that the method 300 has tried all possible amplification gain values, or has maximized the possible amplification gain (when additional gain is employed), or has minimized the possible amplification gain (when less gain is used). If is not possible to further adjust the amplification gain, the method 300 proceeds with the step 322. At the step 322, the method 300 proceeds as if it was unable to obtain sufficient captured fingerprint image. When there is nothing the method 300 can do to obtain further captured fingerprint image, the method 300 proceeds as if the match failed. After the step 322, the method 300 proceeds with the flow point 300B, where the method 300 ends.

At a step 324, the method 300 adjusts (or further adjusts, as appropriate) the amplification gain for the amplifier 144. For example, if the region 150 is overexposed, the method 300 can decrease the amplification gain, while if the region 150 is underexposed, the method 300 can increase the amplification gain. After the step 324, the method 300 proceeds with the step 312, where it attempts to re-image the information associated with the fingerprint image 212.

At a flow point 300B, the method 300 is over. In one embodiment, the method 300 repeats so long as the device is powered on.

Further, method 300 is not the sole method of operation for fingerprint sensors described herein. As previously mentioned, imaging methodologies may be employed constantly and applied to every captured image, or at least whenever any image is captured. Alternatively, and as discussed above, imaging methodologies disclosed herein may be used whenever a captured fingerprint image is of an unacceptable quality, or when a captured fingerprint image cannot be matched. Accordingly, the flowchart shown in FIG. 3 is but one method of operation for embodiments.

Histogram Determination and Segmentation

FIG. 4A generally shows a histogram for a fingerprint image; the histogram may be operated upon as described herein to provide dynamic range scaling in order to more accurately image a fingerprint and extract data from the image. In some embodiments, such dynamic range scaling or adjustment may compensate for fixed pattern noise.

In one embodiment, the outputs from the A/D converters 146 can be extended to provide additional bits of discrimination between distinct shades of gray. For example, more than eight bits of grayscale value can be determined in response to an analog signal coupled from the amplifiers 144 to their corresponding A/D converters 146.

In one embodiment, as each fingerprint image tile 214 is being determined, the processing unit (as described herein) reviews the digital signals 148, determining a histogram 452, relating a grayscale value (shown in the figure on an X axis 454) with a number of fingerprint picture elements 216 (shown in the figure on a Y axis 456). The histogram 452 can often include a relatively significant peak 458 in a relatively saturated region of the grayscale value axis 454, and indicating that fixed pattern noise has affected the fingerprint image tile 214. For example, the fingerprint image tile 214 can often include a relatively saturated vertical bar, in which substantially all of the fingerprint picture elements 216 have been saturated at measurement.

In one embodiment, the processing unit locates the peak 458, removes that portion of the histogram 452 with respect to the peak 458, and divides the histogram 452 into two (or more) portions. Although the method 400 is described with respect to two portions, in the context of the invention, there is no particular requirement for any such limitation. For example, the histogram can be divided into three or more portions, although it might be superior to choose the number of portions as four, eight, or another power of two.

In one embodiment, having divided the histogram 452 into two portions, the processing unit sets two (independently controllable) amplifiers 144 so that a lower half 452a of the histogram can be amplified to a full scale of a corresponding A/D converter 146, and an upper half 452b of the histogram can also be amplified to a full scale of a corresponding A/D converter 146. The lower half 452a of the histogram 452 can be coupled to a corresponding A/D converter 146, providing a selected number of shades of gray, with a corresponding log-base-two bits of grayscale data for each fingerprint image element 216. Similarly, the upper half 452b of the histogram 452 can be coupled to a corresponding A/D converter 146, providing a selected number of shades of gray, with its own corresponding log-base-two bits of grayscale data for each fingerprint image element 216.

With both the grayscale data from the lower half 452a and the grayscale data from the upper half 452b, the values from the two corresponding A/D converters 146 can be combined, with the effect of providing twice as many shades of gray, or one additional bit of grayscale data for each fingerprint image element 216. This can be performed for each fingerprint image tile 214, with respect to the fingerprint image elements 216 associated with that fingerprint image tile 214. In alternative embodiments, this can be performed for the entire fingerprint image 212, with respect to the fingerprint image elements 216 associated with the fingerprint image 212, although the former is believed likely to be superior.

In embodiments wherein the histogram 452 is divided into more than two parts, such as four parts or eight parts, there would be a correspondingly larger number of independently controllable amplifiers 144 and an equivalently larger number of corresponding A/D converters 146. However, in alternative embodiments, it may occur that the histogram 452 can be divided into two or more parts, the individual parts multiplexed using the same hardware amplifiers 144 and A/D converters 146, and the results combined.

In one embodiment, as described herein, there may be two amplifiers 144 corresponding to each fingerprint image tile 214, such as a first amplifier 144 to be used with the lower half 452a of the histogram 452 and a second amplifier 144 to be used with the upper half 452b of the histogram 452. In embodiments in which the histogram 452 is divided into more than two portions, there may be more than two such amplifiers 144. In alternative embodiments, as described herein, the signals input to the amplifier 144 may be multiplexed, operated upon separately for each portion of the histogram 452 by each such amplifier 144, and combined, as described herein. Similarly, in embodiments in which the histogram 452 is divided into more than two portions, there may be more than two such A/D converters 146, one corresponding to each such amplifier 144, or alternatively, the signals that are multiplexed with respect to each amplifier 144 may be multiplexed, operated upon separately for each portion of the histogram 452 by each such A/D converter 146, and combined, as described herein.

Figure 4B:
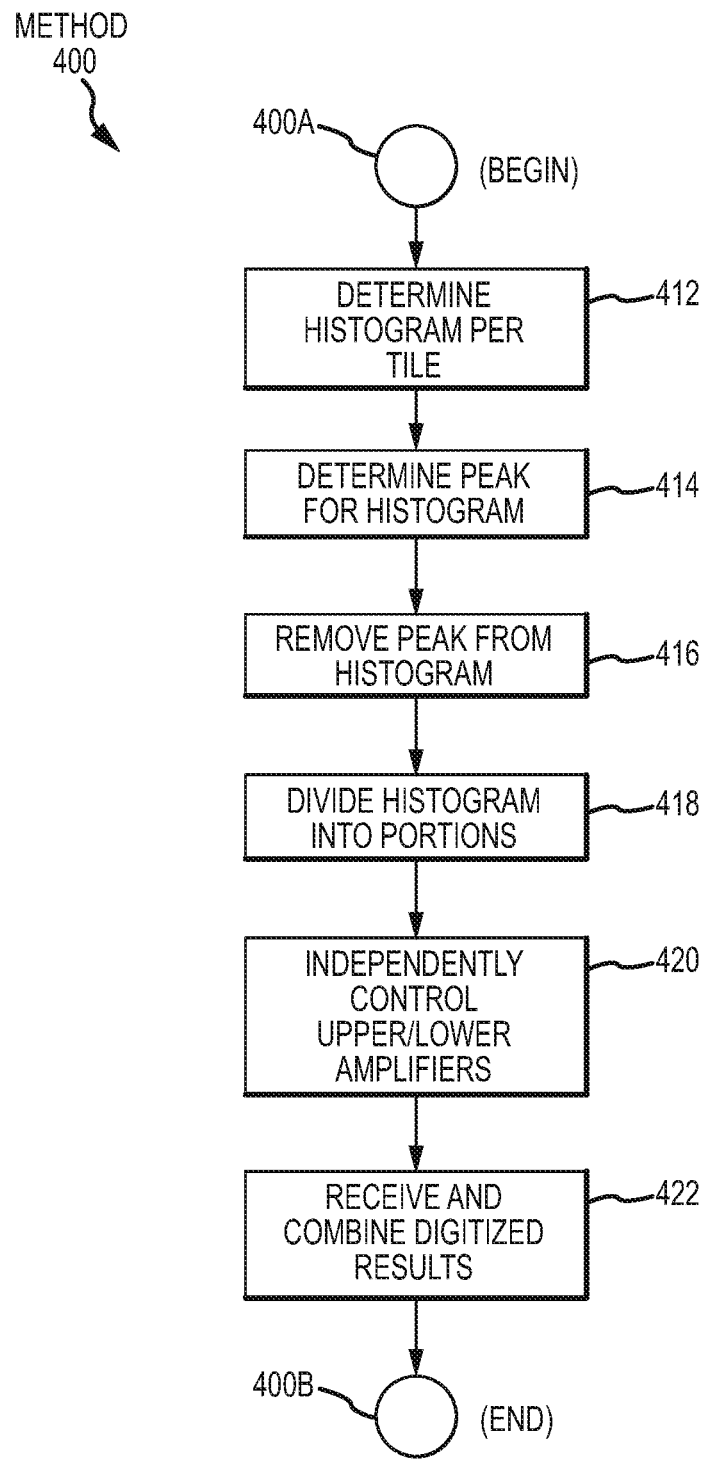
FIG. 4B shows a conceptual drawing of a second method of operation.

A method 400 for histogram scaling, and corresponding dynamic range scaling, is shown generally in FIG. 4B and includes a set of flow points and method steps. Although these flow points and method steps are shown performed in a particular order, in the context of the invention, there is no particular requirement for any such limitation. For example, the flow points and method steps could be performed in a different order, concurrently, in parallel, or otherwise.

Likewise, although these flow points and method steps are sometimes described as being performed by the method 300, in one embodiment, they can be performed by a processing unit in the device, or by hardware provided for the fingerprint sensor system. Although these flow points and method steps are described as performed by a general-purpose processing unit, in the context of the invention, there is no particular requirement for any such limitation. For example, one or more such method steps could be performed by special purpose processing unit, by another circuit, or be offloaded to other processing units or other circuits in other devices, such as by offloading those functions to nearby devices using wireless technology or by offloading those functions to cloud computing functions.

The second method 400 can be performed in addition to the first method 300. The second method 400 can also be performed optionally.

At a flow point 400A, the method 400 is ready to begin.

At a step 412, the method 400 determines a histogram 452 for each fingerprint image tile 214. In one embodiment, the histogram 452 can have 256 separate bins for grayscale values; however, in the context of the invention, there is no particular requirement for any such limitation. For example, in alternative embodiments, the histogram 452 may include some larger or smaller number of shades of gray.

At a step 414, the method 400 determines a peak 458 for the histogram 452, as described herein, located at one end of the histogram 452, indicating cases in which the fingerprint image elements 216 have been maximized or minimized by fixed pattern noise, such as black bars or white bars.

At a step 416, the method 400 removes the peak 458 from the histogram 452. For example, the method 400 can set those bins that it determines are part of the peak 458 to have no fingerprint image elements 216.

At a step 418, the method 400 divides the histogram 452 into a lower portion 452a and an upper portion 452b, at a dividing point 460. In alternative embodiments, in which there are more than two such portions, the method 400 divides the histogram 452 into more than two such portions. For example, the method 400 can determine a median point of the histogram 452, at which the number of fingerprint image elements 216 below that median point equals the number of fingerprint image elements 216 above that median point. Alternatively, the method 400 can determine a half-way point, at an average of the highest and lowest (significantly populated) bin of the histogram 452, or an average grayscale value, at an average shade of gray described by the histogram 452 after its peak 458 has been removed.

At a step 420, the method 400 independently controls a lower-half amplifier 144 and an upper-half amplifier 144, as described herein. In one embodiment, those portions of the signal that would eventually represent those fingerprint image elements 216 in the lower portion 452a of the histogram 452 are amplified by the lower-half amplifier 144 to an entire range of its corresponding A/D converter 146. Similarly, those portions of the signal that would eventually represent those fingerprint image elements 216 in the upper portion 452a of the histogram 452 are amplified by the upper-half amplifier 144 to an entire range of its corresponding A/D converter 146.

In one embodiment, the method 400 controls the lower-half amplifier 144 and the upper-half amplifier 144 so that there is no substantial gap or overlap. However, in the context of the invention, there is no particular requirement for any such limitation. For a first example, the method 400 may control the lower-half amplifier 144 and the upper-half amplifier 144 so that there is a minimal gap or a minimal overlap. For a second example, the method 400 may control the lower-half amplifier 144 and the upper-half amplifier 144 so that a maximum amount of grayscale information can be provided.

At a step 422, the method 400 receives the results of the corresponding A/D converters 146 associated with the lower-half amplifier 144 and the upper-half amplifier 144. As part of this step, the method 400 combines those results. For example, the method 400 can prepend a bit "0" to the results from the A/D converter 146 associated with the lower-half amplifier 144, and prepend a bit "1" to the results from the A/D converter 146 associated with the upper-half amplifier 144. A result of this step can be provided by the method 400 as a set of fingerprint picture elements 216 with superior dynamic range.

At a flow point 400B, the method 400 is over. In one embodiment, the method 400 repeats so long as the device is powered on.

Touch I/O Device Including Fingerprint Recognition System

Figure 5A:
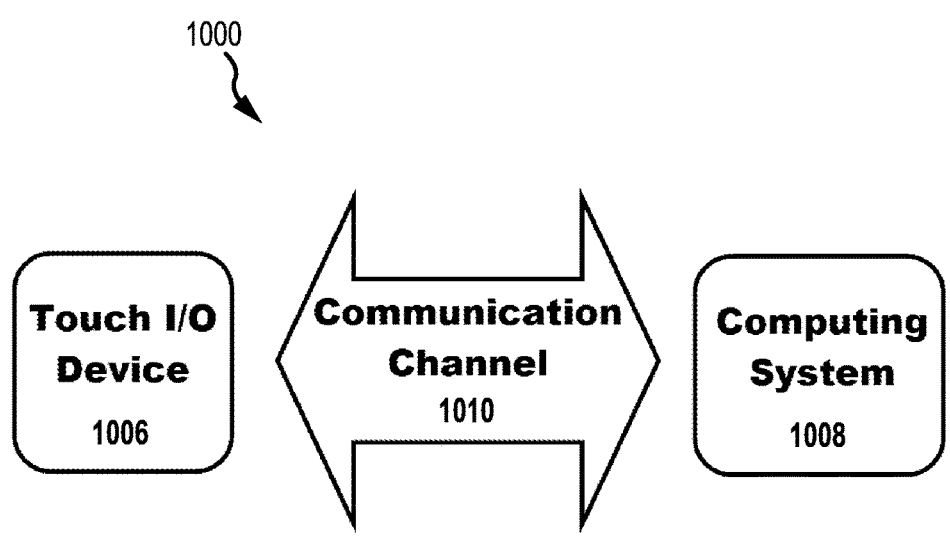
FIG. 5A shows a conceptual drawing of communication channel between a device and a computing system.
Figure 5B:
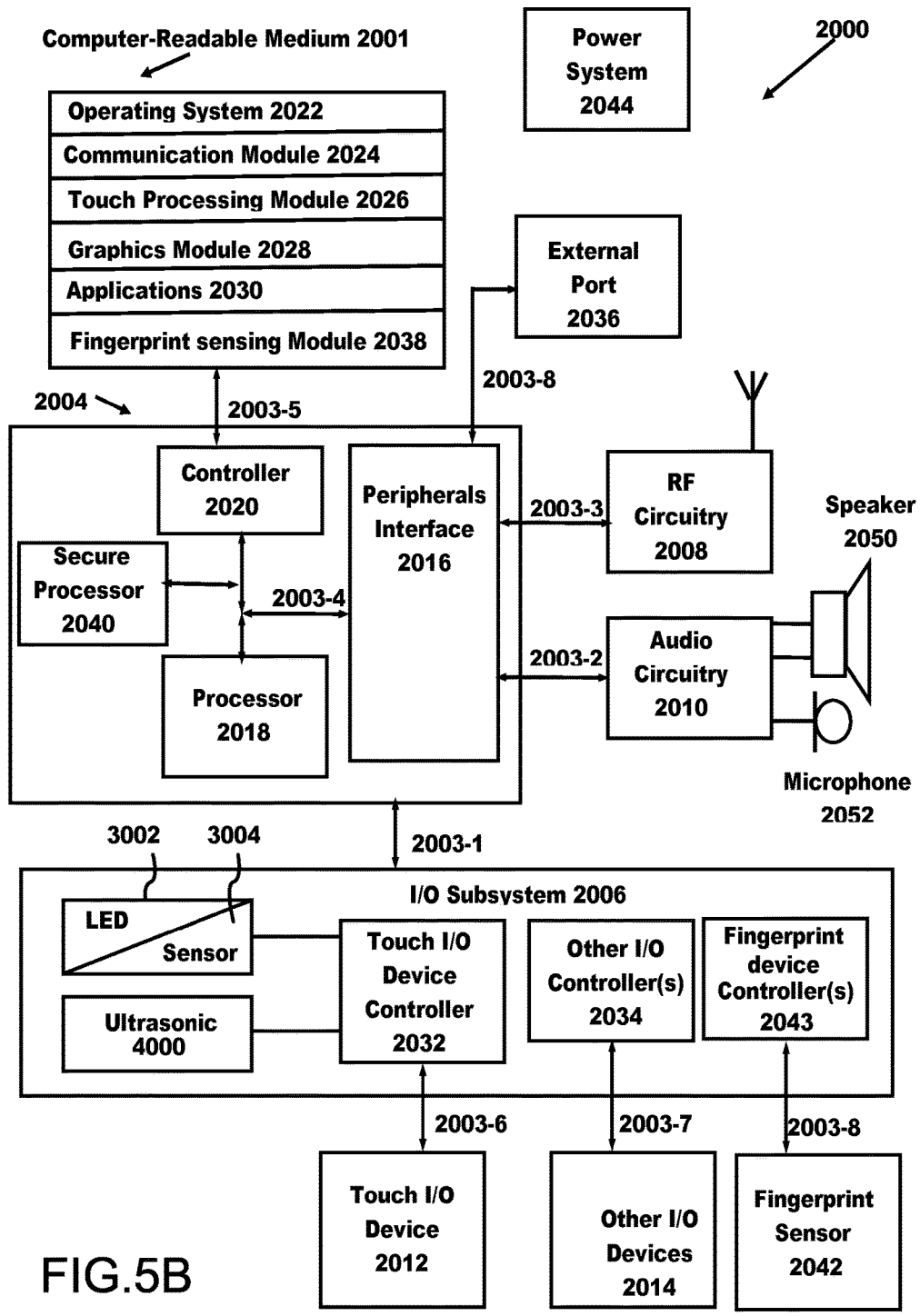
FIG. 5B shows a schematic drawing of a touch I/O device including a fingerprint recognition system.

FIG. 5 (collectively including FIG. 5A and FIG. 5B) shows a conceptual drawing of a touch I/O device including a fingerprint recognition system.

A touch I/O electronic device or system 1000 can include a touch-sensitive input/output (touch I/O) device 1006 in communication with computing system 1008 via communications channel 1010.

Described embodiments may include touch I/O device 1006 that can receive touch input for interacting with computing system 1008 via wired or wireless communication channel 1002. Touch I/O device 1006 may be used to provide user input to computing system 1008 in lieu of or in combination with other input devices such as a keyboard, mouse, etc. One or more touch I/O devices 1001 may be used for providing user input to computing system 1008. Touch I/O device 1006 may be an integral part of computing system 1008 (e.g., touch screen on a laptop) or may be separate from computing system 1008.

For example, touch I/O device 1006 can interact with a user with the user touching the touch I/O device 1006 with the user's finger (or otherwise bringing the user's finger near to the touch I/O device 1006), with the effect that the touch I/O device 1006 can receive fingerprint image data, and optionally provide feedback to the user that the fingerprint image data was received.

Touch I/O device 1006 may include a touch sensitive panel which is wholly or partially transparent, semitransparent, non-transparent, opaque or any combination thereof. Touch I/O device 1006 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad, or other pointing device) or any multi-dimensional object having a touch sensitive surface for receiving touch input, or another type of input device or input/output device.

In one example, touch I/O device 1006 embodied as a touch screen may include a transparent and/or semitransparent touch sensitive panel partially or wholly positioned over at least a portion of a display. According to this embodiment, touch I/O device 1006 functions to display graphical data transmitted from computing system 1008 (and/or another source) and also functions to receive user input. In other embodiments, touch I/O device 1006 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1006 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures or fingerprints. A gesture or fingerprint may correspond to stationary or non-stationary, single or multiple, touches or near touches on touch I/O device 1006. A gesture or fingerprint may be performed by moving one or more fingers or other objects in a particular manner on touch I/O device 1006 such as tapping, pressing, rocking, scrubbing, twisting, changing orientation, pressing with varying pressure and the like at essentially the same time, contiguously, or consecutively. A gesture or fingerprint may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1008 may drive a display with graphical data to display a graphical user interface (GUI). The GUI may be configured to receive touch input via touch I/O device 1006. Embodied as a touch screen, touch I/O device 1006 may display the GUI. Alternatively, the GUI may be displayed on a display separate from touch I/O device 1006.

The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1006 which may be associated with the graphical elements of the GUI. In other embodiments, the user may perform gestures at one or more locations that are independent of the locations of graphical elements of the GUI. Gestures performed on touch I/O device 1006 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1008 (e.g., affect a state or mode of a GUI, application, or operating system). Gestures may or may not be performed on touch I/O device 1006 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1010 in response to or based on the touch or near touches on touch I/O device 1006. Feedback may be transmitted optically, mechanically, electrically, olfactory, acoustically, or the like or any combination thereof and in a variable or non-variable manner. For example, feedback can include interaction with a user indicating (A) that one or more sets of fingerprint image information have been received, (B) that one or more sets of fingerprint image information have been enrolled in a database, (C) that one or more sets of fingerprint image information have been confirmed as associated with the user, or otherwise.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. A block diagram of one embodiment of system 2000 generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in the figure is only one example architecture of system 2000, and that system 2000 could have more or fewer components than shown, or a different configuration of components. The various components shown in the figure can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments wherein touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with figures as shown herein. Fingerprint sensing module 2038 may at least function to perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Both processor 2018 and secure processor 2040 are examples of processing units, and it should be appreciated that one or both may be multi-core and/or multi-chip elements in some embodiments. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The operation of these various elements will now be described.

The fingerprint sensor 2042 may operate to capture a series of images, or nodes. When taken together, these nodes may form a set of fingerprint image information. A collection of nodes may be referred to herein as a "mesh", "mosaic", "template", or other indicator of fingerprint information.

Each node of fingerprint information may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the fingerprint information.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. Generally, the fingerprint data is encrypted by any of the fingerprint sensor 2042, the fingerprint I/O controller 2044 or another element prior to being transmitted to either processor. The secure processor 2040 may decrypt the data to reconstruct the node.

Fingerprint data may be stored in the computer-readable medium 2001 and accessed as necessary. In some embodiments, only the secure processor 2040 may access stored fingerprint data, while in other embodiments either the secure processor or the processor 2018 may access such data.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

We claim:

1. A method for receiving fingerprint information, comprising:
    receiving, at a first time, a first fingerprint element image at first signal conditioning settings, the first fingerprint element image captured by an array of sensor elements in a first image capture operation;
    measuring an exposure of the first fingerprint element image to determine whether a first portion of a first plurality of portions of the first fingerprint element image is underexposed or overexposed; and
    in response to determining that the first portion of the first fingerprint element image is underexposed or overexposed:
        receiving, at a second time different from the first time, a second fingerprint element image at second signal conditioning settings, the second fingerprint element image captured by the array of sensor elements in a second image capture operation; and
        combining a second portion of a second plurality of portions of the second fingerprint element image with a subset of the first plurality of portions of the first fingerprint element image to generate a composite; wherein
    the second portion of the second fingerprint element image corresponds to the first portion of the first fingerprint element image that is underexposed or overexposed.

2. The method of claim 1, wherein the first signal conditioning settings are different from the second signal conditioning settings.

3. The method of claim 2, wherein:
    the first signal conditioning settings comprise a first gain setting; and
    the second signal conditioning settings comprise a second, unique gain setting.

4. The method of claim 1, wherein each of the first fingerprint element image and the second fingerprint element image is captured by a unique set of the array of sensor elements.

5. The method of claim 1, wherein each of the first fingerprint element image and the second fingerprint element image is captured by a same set of the array of sensor elements.

6. The method of claim 1, wherein measuring the exposure of the first fingerprint element image to determine whether the first portion of the first fingerprint element image is underexposed or overexposed comprises:
    measuring the exposure of the first portion to determine that the first portion is over-saturated.

7. The method of claim 1, wherein measuring the exposure of the first fingerprint element image to determine whether the first portion of the first fingerprint element image is underexposed or overexposed comprises:
    measuring the exposure of the first portion to determine that the first portion is under-saturated.

8. The method of claim 1, further comprising:
    in response to determining that the first portion of the first fingerprint element image is underexposed or overexposed, instructing the array of sensor elements to re-image a finger, thereby generating the second fingerprint element image.

9. The method of claim 8, wherein the second fingerprint element image is generated at a distinct gain setting.

10. The method of claim 1, further comprising:
    in response to determining that the first portion of the first fingerprint element image is underexposed or overexposed, instructing the array of sensor elements to re-image only a portion of a finger corresponding to the first portion of the first fingerprint element image that is inadequately exposed, thereby generating the second portion of the second fingerprint element image.

11. The method of claim 1, further comprising:
    determining whether the second fingerprint element image, captured at second signal conditioning settings, will adequately expose the second portion of the second fingerprint element image corresponding to the first portion of the first fingerprint element image that is underexposed or overexposed; and
    in response to such a determination, instructing the array of sensor elements to re-image a finger, thereby generating the second fingerprint element image.

12. A fingerprint imaging apparatus, comprising:
    a fingerprint sensor comprising an array of sensor elements;
    at least a first amplifier operatively connected to the fingerprint sensor; and
    a processing unit operatively connected to the fingerprint sensor and the at least one amplifier, and configured to:
        at a first time, cause a first image to be captured by the array of sensor elements of the fingerprint sensor in a first single image capture operation;
        determine if a first portion of a first plurality of portions of the first image is underexposed or overexposed; and
        in response to determining that the first portion of the first fingerprint element image is underexposed or overexposed:
            at a second time, cause a second image to be captured by the array of sensor elements of the fingerprint sensor in a second single image capture operation; and
            combine a second portion of a second plurality of portions of the second image with a subset of the plurality of portions of the first image to generate a composite image; wherein the second portion of the second image corresponds to the first portion of the first image that is underexposed or overexposed.

13. The fingerprint imaging apparatus of claim 12, further comprising:
    a memory operatively connected to the processing unit and storing a plurality of fingerprint images;
    wherein the processing unit is operative to compare the composite image to at least one of the plurality of fingerprint images.

14. The fingerprint imaging apparatus of claim 13, further comprising a multiplexer operatively connected to the fingerprint sensor; wherein:
    each of the plurality of sensor elements outputs a signal, thereby forming a plurality of signals; and
    the multiplexer is operative to multiplex the plurality of signals.

15. The fingerprint imaging apparatus of claim 14, further comprising at least a second amplifier operatively connected to the fingerprint sensor and the processing unit.

16. The fingerprint imaging apparatus of claim 15, wherein:
    the at least the first amplifier is operative to amplify a first subset of the plurality of signals;
    the at least the second amplifier is operative to amplify a second subset of the plurality of signals; and
    the first and second subsets of the plurality of signals are different.

17. The fingerprint imaging apparatus of claim 12, wherein the processing unit is embedded in a common substrate with the fingerprint sensor.

18. A method of receiving fingerprint information, comprising:
    capturing, at a first time, a first fingerprint element image in a first image capture operation, the first fingerprint element image comprising a plurality of portions;
    receiving a first portion of the plurality of portions;
    amplifying the first portion at a first signal conditioning setting, thereby producing a first conditioned portion;
    determining whether the first conditioned portion is underexposed or overexposed;
    in response to determining that the first conditioned portion is underexposed or overexposed, capturing, at a second time, a second portion of a second fingerprint image, corresponding to the first portion, in a second image capture operation;
    amplifying the at least the second portion at a second signal conditioning setting, thereby producing a second conditioned portion; and
    employing the second conditioned portion with a subset of the plurality of portions of the first fingerprint element image to form a composite fingerprint image.

19. The method of claim 18, wherein the first and second portions generally correspond to a single area of a fingerprint.

20. The method of claim 19, further comprising:
    determining the existence of a fixed pattern noise element in the first portion; and
    removing the fixed pattern noise element from the first portion.

21. The method of claim 19, further comprising determining a peak portion of a histogram of grayscale values in the first portion; and removing the peak portion.

* * * * *